Oct. 8, 1963 M. L. JACKSON ETAL 3,106,026
TEACHING MACHINE
Filed June 16, 1961 2 Sheets-Sheet 1

INVENTORS
MERLON L. JACKSON
PHILIP MERLIN
BY JOSEPH S. CAMERON
Darby & Darby
ATTORNEYS

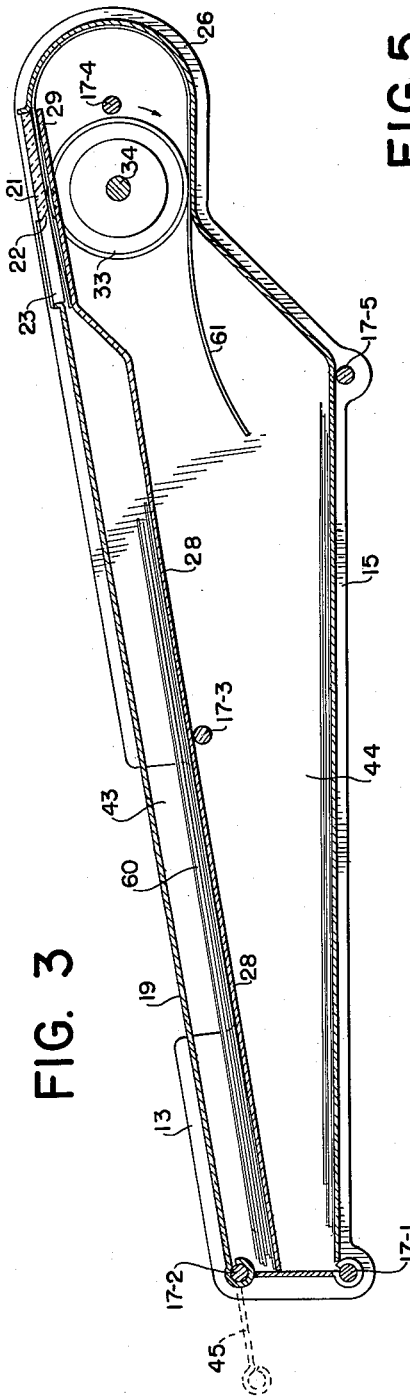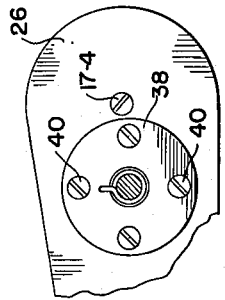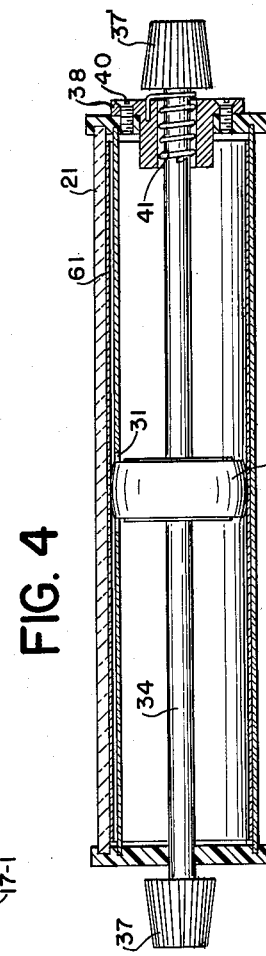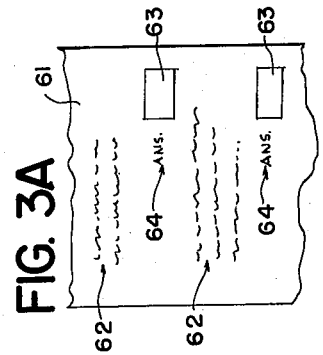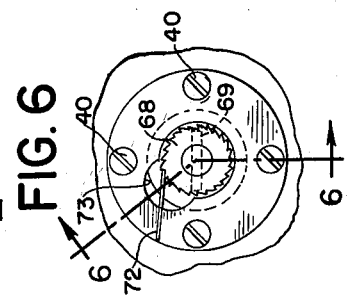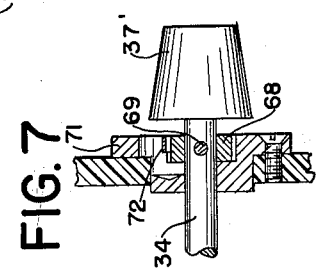
INVENTORS
MERLON L. JACKSON
PHILIP MERLIN
BY JOSEPH S. CAMERON
Darby & Darby
ATTORNEYS 3,106,026
TEACHING MACHINE
Merlon L. Jackson, North White Plains, Philip Merlin, Bronx, and Joseph S. Cameron, Rye, N.Y., assignors to J. F. Auer, Inc., Mamaroneck, N.Y., a corporation of New York
Filed June 16, 1961, Ser. No. 117,590
3 Claims. (Cl. 35—9)

This invention relates to the field of educational aids and more particularly to student-operated teaching machines.

In order to aid the learning processes of individual students in various subjects, for example, mathematics, many types of teaching aids and devices have been developed. The present invention relates to one such aid by which a student can perform self tests for instructional purposes or by which tests can be given in which the student is given the correct answer after he has had a chance to solve and answer the problem.

In accordance with the invention, a teaching machine is provided in which a number of problem sheets having one or more problems and the answers to the problems thereon are placed within the machine. The machine has a transparent window through which one problem at a time is shown and the student manually feeds a problem sheet to a hand-operated roller which he then turns to place a problem in front of the window. The window has a cut-out portion through which the student writes his answer in the space provided on the problem sheet after he has read and solved the problem. A portion of the window is made opaque and the answer to that particular problem on which the student is working is hidden behind the opaque portion. As the student turns the roller to get to the next problem, the answer appears from behind the opaque portion and is made visible under the window so that the student can check it against his own answer.

In accordance with the invention, the roller is made so that it can rotate in only one direction. While the student can rotate the roller and move the problem sheet in a direction so as to see the answer and to bring a new problem into view under the window, he cannot rotate the shaft in the other direction so as to place the answer portion of the problem sheet in view before he answers the problem independently. Therefore, the answer must be made by the student independently without first looking at the answer on the problem sheet and only a single answer can be written down on the problem sheet. Once made, the student's answer cannot be changed after he has seen the answer appearing on the problem sheet and if he does not answer the problem, the answer space is left blank.

It is therefore an object of this invention to provide a teaching machine.

Another object of this invention is to provide a teaching machine in which a plurality of problem sheets can be placed, each sheet being placed in working position by the machine operator.

A further object of this invention is to provide a teaching machine in which the answer written by the student cannot be changed after the student has viewed the answer printed on the problem sheet.

It is a further object of this invention to provide a teaching device in which the problem sheets located therein are movable in one direction only.

Other objects and advantages of the present invention will become more apparent upon reference to the following specification and annexed drawings, in which, FIGURE 1 shows a perspective view of the teaching machine;

FIGURE 3 shows a side elevation view of the machine taken in section along lines 3—3 of FIGURE 2;

FIGURE 3A shows a typical problem sheet;

FIGURE 4 is a section taken along lines 4—4 of FIGURE 2 showing the drive mechanism for the sheets;

FIGURE 5 is a side elevational plan view of the drive shaft and bushing taken along lines 5—5 of FIGURE 2;

FIGURES 6 and 7 are views of another arrangement for securing one-way rotation of the drive shaft.

Figure 1:
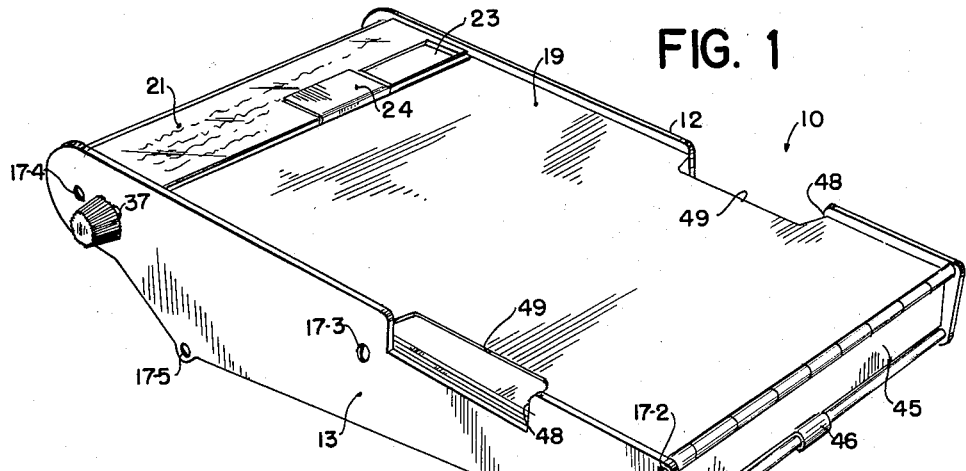
Figure 2:
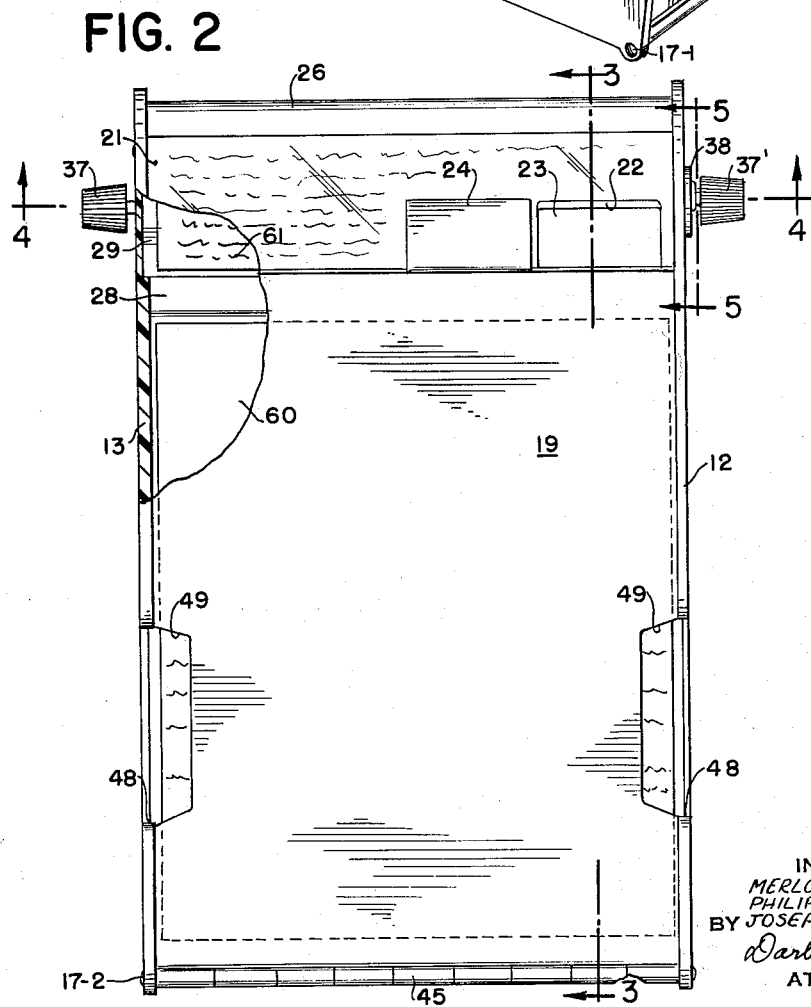
FIGURE 2 shows a top plan view of the teaching machine broken away along a portion thereof.

Referring to FIGURES 1-3, the teaching machine 10 is formed by side frame members 12 and 13 which are joined together by a bottom base member 15 and cross-struts 17—1, 17—2, 17—3, 17—4 and 17—5. Struts 17—1 and 17—5 are located at the bottom of the side frames and extend through the base 15, while struts 17—2, 17—3 and 17—4 are located at the front, center and rear of the machine near the top of the side frames. Each of the struts is fastened by means of a screw or other similar device.

Also fastened between the side frame members 12 and 13 is an opaque cover plate 19 which covers a substantial portion of the top of the machine. As shown, the bottom end of cover 19 is hinged around strut 17—2. If desired, the cover 19 need not be fastened to the side frames so that it may therefore be raised and lowered by means of the hinged fastening. Located above the top of the cover 19 and fastened to the side frames 12 and 13 is a transparent window 21 which has near its right edge a substantially rectangular cutout portion 23. The portion of the window at the top of the cutout is beveled downwardly at 22 in order to prevent the paper problem sheets from catching. A portion 24 of the window 21 to the left of the cutout 23 is made opaque in order to obscure the answers on the problem sheets. The side frame members 12 and 13 are shaped so that the window 21 is higher than the other end of the device when the machine rests on a flat surface. The outer housing at the window end of the machine is formed by a curved portion 26.

A shelf 28 is fastened between the side frame members 12 and 13 near the top thereof and also rests on the cross-strut 17—3. One end of the shelf 28 is bent upwardly to have a section 29 which passes under the window 21 with a space therebetween which is wide enough to allow the passage of one problem sheet at a time. Shelf section 29 is cut out near the center thereof to accommodate a roller 33 which is mounted for rotation on a shaft 34. The diameter of the roller 33 is selected so that the roller presses against both the window 21 and the bottom of the curved portion 26 of the housing. One end of the shaft 34 passes through a hole in the side member 13 and has a knob 37 connected thereto. The other end of shaft 34 passes through a bushing 38 which is mounted within a hole in the side frame member 12 and is fastened thereto by means of screws 40, or other suitable fastening device. This end of the shaft has a knob 37' connected thereto.

A spring 41 is placed over the end of the shaft which rotates within the bushing 38 (FIGURE 4) and only a narrow clearance is provided between the spring and the bushing. One end of the spring is fastened to a hole within the bushing. The spring is placed on the shaft so that it will not uncoil when the shaft is rotated in a clockwise direction; i.e., to advance a problem sheet. However, when the shaft is rotated in the opposite direction (counterclockwise) the spring will uncoil and jam the shaft within the bushing, so that it cannot rotate. In this manner, the shaft and roller are permitted to rotate in only one direction.

The shelf 28 divides the inside of the machine 10 into an upper compartment 43, between the top of shelf 28 and the bottom of the cover 19, and a bottom compartment 44, between the bottom of the shelf 28 and the top of the base 15. Top compartment 43 is used to hold new problem sheets which are placed in the machine, and bottom compartment 44 holds the used sheets. Access is gained to the compartments 43 and 44 by means of a door 45 which is mounted on a hinge around cross-strut 17—2. The door 45 has a spring-type bottom fastening member 46 which holds the door closed as it grips around cross-strut 17—1. If desired, a lock may be provided on the door 45. The side frames 12 and 13 are cut out at sections 48 and the top cover 19 cut out at sections 49 to allow the student limited access to the top compartment 43 which holds the new problem sheets.

The operation of the machine is as follows: in order to load the new problem sheets in to the machine, the door 45 is swung upwardly, to the open position shown by the dotted lines in FIGURE 3. The problem sheets are then placed in a stack 60 on the top of shelf 28. The door 45 is then closed and locked, if desired. A typical problem sheet 61 is shown in FIGURE 3A and has a respective problem written thereon in each space 62; a space 63 for the student to write his answer to each problem, and a printed answer 64 for each problem.

In order for the student to operate the machine, he places his fingers into the top compartment 43 through the small space provided by cut-out sections 48 and 49 and moves one problem sheet 61 toward the window 21. The sheet 61 passes between window 21 and the shelf section 29 until it comes into engagement with the roller 33 at the window 21. At that point the student turns either of the knobs 37 or 37', thereby turning the shaft 34 and advancing the problem sheet 61 under the window 21. The sheet 61 is advanced until the first problem on the sheet is completely in view under the window 21. At that point the student answer space 63 for the problem is under the cut-out 23 and the answer 64 is behind the opaque portion 24 of the window. As pointed out before, the shaft 34 is allowed to rotate only in a direction to advance the problem sheet so the student cannot look at the answer 64 first and then turn back to answer space 63.

After the complete problem is in view, the student reads and analyzes it, and then formulates his answer. The answer is then written on the sheet 61 in the space 63 which appears under the cut-out 23. The top shelf portion 29 serves as a writing desk so that the student can write his answer on the paper. The student then advances the sheet 61 by rotating the knobs 37 or 37' until the answer 64 comes into view above the opaque portion 24. The student then compares the correct answer 64 which appears on the sheet 61 with the answer he had written in the answer space 63. The answer space 63 now appears above the cut-out 23 under the window 21 where it cannot be gotten at for change or alteration by the student. Because the shaft 34 can only be rotated in a direction to advance the problem sheet 61, the student cannot rotate the sheet backwards to make the answer written by him reappear in the cut-out 23 where he can change it. Also, the student cannot first look at the answer and then move the answer space 63 back under the opening 23. In this manner, all possibilities of the student utilizing the printed answer 64, which would defeat the learning process, are substantially eliminated.

The sheet 61 is then continued to be moved and the next problem which appears on it is answered in turn. The used portion of the problem sheet 61 is bent around the housing 26 and is driven between the roller 33 and the curved housing 26 to feed into the lower compartment 44. After the last problem on the sheet has been answered, the knob is rotated until the sheet 61 falls into the lower compartment 44 from which it may be emptied through door 45 for subsequent filing and/or marking by the instructor or for subsequent use by the student. At this point, the student is then ready to manually place the next sheet on the top of pile 60 into engagement with the roller 33 and repeat the process previously described.

In order to provide a more positive locking arrangement so that the shaft 34 and consequently the problem sheets can be moved in only one direction, the arrangement shown in FIGURES 6 and 7 may be utilized. In this arrangement, a small, toothed ratchet wheel 68 is fastened to the shaft 34 within a recessed portion cut in the bushing 71 by a pin 69. A spring member 72 is fastened by welding or soldering or other suitable process to a slot in the bushing 71. The spring 72 rides over the teeth of the ratchet wheel 68 within a hole 73. When the knobs 37 or 37' are turned so that the shaft rotates in a clockwise direction, as shown by the curved arrow of FIGURE 6, the spring 72 rides over the teeth and the shaft rotates. However, if the shaft is moved in the counterclockwise direction, the spring member 72 engages one of the teeth and prevents the shaft's rotation so that the problem sheet cannot be moved away from window 21.

As another arrangement for providing one-way rotation of the shaft 34, a toothed ratchet wheel similar to wheel 68 is used. A U-shaped bracket is placed over the end of the shaft in a manner so that the bracket cannot turn. The bracket has a lengthwise slit so that it can move up and down on the shaft. The arms of the bracket are made so that one fits over the crest of a tooth while the other rests in the notch between two teeth. As the shaft is rotated in a clockwise direction, the bracket is alternately raised and lowered by the teeth which engage the bracket arms, thereby providing a clearance so that the shaft can turn. When the shaft is rotated in a counterclockwise direction, the bracket is not lifted since the teeth on the wheel face in the wrong direction. The bracket engages a tooth on the wheel and thereby prevents the shaft from turning in the counterclockwise direction.

While the cut-out 23 is shown on the right side of the window 21, it should be realized that both its position and size as well as the position and size of the opaque portion 24 on the window 21 may be selected and changed, as desired, to accommodate different problem sheets and different machine users. In a preferred embodiment of the invention this is accomplished by making the window 21 removable so that any desired window may be inserted. In this case, one or both of the side frames 12 and 13 would have a removable piece opposite the window 21, and the removable pieces are held to the frames by screws, or other suitable fastening devices. Different windows with different size and positioned cut-outs and opaque portions can then be inserted and removed to accommodate different types of writers and different types of problem sheets.

It should be realized that any suitable materials may be used in constructing the machine of the present invention. For example, the rollers 33 may be made of rubber, and if desired, two or more may be utilized instead of the single roller shown. Further, a single roller can be used which spans the whole length of the shaft 34 within the side frames of the device. While only a spring and a ratchet type arrangement have been shown for preventing reverse movement of the shaft, other suitable arrangements which are well known in the art may also be utilized. Further, the complete outside covering, including the side frames 12 and 13 and the rear piece 26 may be manufactured of plastic, and preferably by a one- or two-piece molding operation. The top cover 19 and the plate 28 may also be made of any suitable material such as plastic, or metal, and, the window 21 is preferably made of a transparent plastic material.

It can therefore be seen that a teaching device has been disclosed which is both easy to operate and economical to produce. One of the advantages achieved by the present invention is that problems can be printed up on single sheets, often at the school location itself, and these sheets can be filed conveniently in a notebook, etc. Also, the machine does away with the need for complex drive mechanisms for feeding the problem sheets, so that the student can work on them. Further, the teaching aid of the present invention prevents a student from changing his answer on the problem sheet viewed, or from viewing the correct answer before he writes his own.

While a preferred embodiment of the invention has been described above, it will be understood that it is illustrative only, and the invention is to be limited solely by the appended claims.

What is claimed is:

1. In a teaching machine the combination comprising an outer housing, a first internal compartment adapted for holding problem sheets, each of said problem sheets having thereon a problem, a problem answer space and an answer to the problem, a transparent window having a cutout portion and an opaque portion, a shaft extending through said housing and mounted for rotation therein, roller means connected to said shaft for rotation therewith adapted for engaging a problem sheet from said first compartment to move it in a direction so that the problem on a sheet lies under the window with the problem answer space in registry with the cutout portion and the answer under the opaque portion, a ratchet wheel, means for engaging said ratchet wheel to permit said shaft to be rotated only in one direction, and an opening in said outer housing to permit limited access to said first internal compartment whereby the machine operator is permitted to move the problem sheets in the first compartment into engagement with said roller means.

2. In a teaching machine the combination comprising an outer housing, a first internal compartment adapted for holding problem sheets, each of said problem sheets having thereon a problem, a problem answer space and an answer to the problem, a transparent window having a cutout portion and an opaque portion, a shaft extending through said housing and mounted for rotation therein, roller means connected to said shaft for rotation therewith adapted for engaging a problem sheet from said first compartment to move it in a direction so that the problem on a sheet lies under the window with the problem answer space in registry with the cutout portion and the answer under the opaque portion, a spring cooperating with said shaft and said housing, said spring permitting said shaft to be rotated only in one direction, and an opening in said outer housing to permit limited access to said first internal compartment whereby the machine operator is permitted to move the problem sheets in the first compartment into engagement with said roller means.

3. In a teaching machine the combination comprising an outer housing, a first internal compartment adapted for holding problem sheets, each of said problem sheets having thereon a problem, a problem answer space and an answer to the problem, a transparent window having a cutout portion and an opaque portion, a shaft extending through said housing and mounted for rotation therein, said shaft adapted to be rotated by the machine operator, roller means connected to said shaft for rotation therewith adapted for engaging a problem sheet from said first compartment, said roller engaging a sheet between the roller and the housing to move the sheet in a direction so that the problem on a sheet lies under the window with the problem answer space in registry with the cutout portion and the answer under the opaque portion, means cooperating with said shaft to permit rotation only in one direction so that said problem sheets can be moved only away from said first compartment, and an opening in the outer housing to permit limited access to said first internal compartment whereby the machine operator is permitted to move the problem sheets in the first compartment into engagement with the roller means.

References Cited in the file of this patent

UNITED STATES PATENTS

| | | |
|---|---|---|
| 265,855 | Nelson et al. | Oct. 10, 1882 |
| 1,569,946 | Buettner | Jan. 19, 1926 |
| 2,169,266 | Matter | Aug. 15, 1939 |
| 2,707,115 | Rolleston | Apr. 26, 1955 |
| 3,056,215 | Skinner | Oct. 2, 1962 |